US006250457B1

(12) United States Patent
Spurck et al.

(10) Patent No.: US 6,250,457 B1
(45) Date of Patent: Jun. 26, 2001

(54) ENGINEERING CLASS STEEL CONVEYOR CHAIN

(75) Inventors: Fredric C. Spurck; James F. Riedel, both of Tiffin, OH (US)

(73) Assignee: Webster Industries, Inc., Tiffin, OH (US)

(*) Notice: Subject to any disclaimer, the term of this patent is extended or adjusted under 35 U.S.C. 154(b) by 0 days.

(21) Appl. No.: 09/454,210

(22) Filed: Dec. 9, 1999

(51) Int. Cl.$^7$ .................................................. B65G 39/20
(52) U.S. Cl. ................................... 198/845; 198/817
(58) Field of Search ................................ 198/817, 845

(56) References Cited

U.S. PATENT DOCUMENTS

| 2,275,244 | * | 3/1942 | Bee et al. ........................... 198/845 |
| 2,628,705 | | 2/1953 | Kline et al. . |
| 2,816,453 | | 12/1957 | Frank et al. . |
| 4,615,171 | | 10/1986 | Burk . |
| 5,226,856 | | 7/1993 | Iacchetta et al. . |

FOREIGN PATENT DOCUMENTS 730408    3/1966   (CA) .

OTHER PUBLICATIONS

Karen Auguston Field, Powered Conveyors For Heavy Duty Loads, from Modern Materials Handling, Equipment Report, Aug. 1997, pp. 37–40.

Material regarding Glass Reinforced Nylon From ERIKS/Midwest of Aurora, Illinois, undated.

* cited by examiner

*Primary Examiner*—Joseph E. Valenza
(74) *Attorney, Agent, or Firm*—Emch, Schaffer, Schaub & Porcello, Co., L.P.A.

(57) ABSTRACT

An improved engineering steel conveyor chain capable of supporting a downward load as the chain moves along a horizontal path is disclosed. The conveyor chain includes a plurality of interconnected link assemblies. The link assemblies include spaced parallel metal side bars and a plurality of roller assemblies mounted for rotation between the metal side bars. Each of the roller assemblies include an outer metal roller and an inner plastic bushing. The plastic bushing has a compressive strength between 20,000 and 25,000 psi and includes protuberances at its ends for restricting engagement of the outer metal roller with the side bars. The plastic bushing includes an inner lubricous surface thereby eliminating the need for supplemental lubrication.

9 Claims, 4 Drawing Sheets

ENGINEERING CLASS STEEL CONVEYOR CHAIN

BACKGROUND OF THE INVENTION

Chains are well known in the art and are normally classified by use. Roller chains are used, for example, to drive a sprocket. In this type of chain, tension forces are applied along the length of the chain. Normally no forces are applied perpendicular to the path of travel of the chain.

Another type of chain is an engineering class steel chain. While roller chain primarily meet drive chain needs, engineering steel chains are often used where designed for difficult conveying applications. The present invention is directed to an engineering class steel chain which is used to convey, for examples, truck or automobile components in a factory operation. The vehicles are placed on custom designed pallets which are normally carried along the upper surface of the engineering steel conveyor chain. The weight of the vehicles places a downward compression load on the upper surface of the conveyor chain.

The conveyor chains include side bars and rotating steel rollers which support the pallets. Normally pins extend between the side bars of the conveyor chain and rollers are mounted for rotation on the bushing pin. It has been found that as the chains wear, the friction and loading of the chains tend to restrict rotation of the rollers. To alleviate this problem, it is common to lubricate the rollers with various types of lubricating oils or greases. The wear, maintenance and cleaning of prior art chains create problems for the users. In addition to the inherent problems with the use of solvents, the overall waste problems and wear problems are significant.

The present invention is directed to an improved engineered steel chain, for carrying loads perpendicular to the path of chain movement.

SUMMARY OF THE INVENTION

The present invention is directed to an improved conveyor chain and more specifically to an improved engineering steel chain. The improved conveyor chain is suitable for carrying a downward load while moving along a horizontal path. The improved conveyor chain includes a plurality of inner connected link assemblies. The link assemblies include spaced parallel metal side bars and a plurality of roller assemblies which are mounted for rotation between the metal side bars. Each of the roller assemblies includes an outer metal roller defining an outer support surface and an inner opening. A cylindrical plastic bushing is positioned within the inner opening of each of the outer metal rollers. The plastic bushing has a compressive strength of between 20,000 and 25,000 psi. The plastic bushing also defines a central opening for receiving a pin bushing extending between the metal side bars. In a preferred embodiment, the plastic bushing is constructed of a glass reinforced nylon which includes a polytetrafluoroethylene. Preferably, the plastic bushing also includes silicon.

The outer metal roller has opposed ends and a predetermined width. The plastic bushing has a width greater than the predetermined width of the roller thereby defining an upset or protuberance at each end of the bushing. The upset restricts movement of the metal roller against the side bars.

DETAILED DESCRIPTION OF THE PREFERRED EMBODIMENTS

Figure 1:
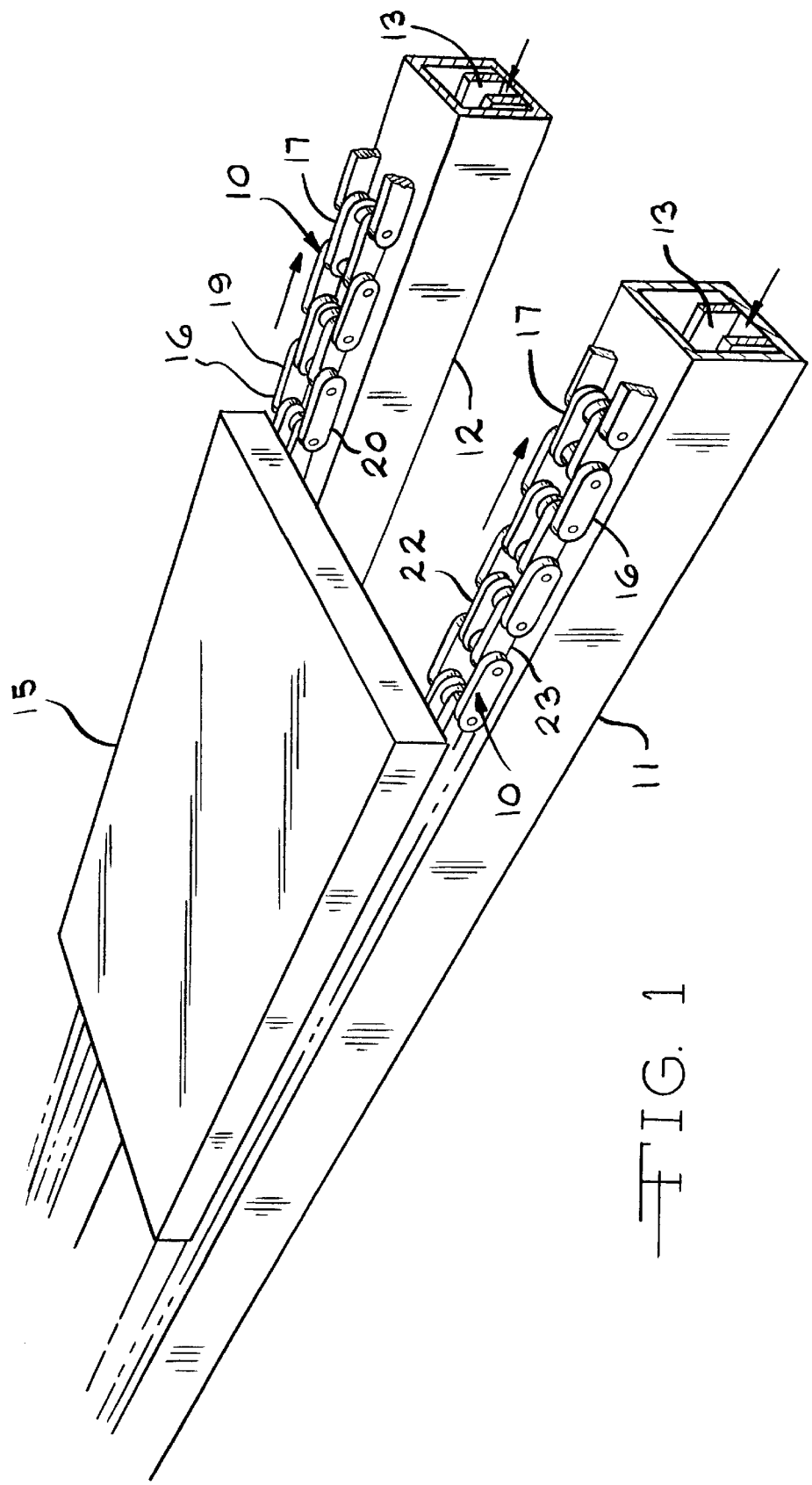
FIG. 1 is a perspective view of a portion of a vehicle manufacturing line, showing the improved conveyor chain, according to the present invention.

Referring to FIG. 1, an improved conveyor chain, more specifically an improved engineering class steel chain, is generally indicated by the reference number 10. The conveyor chain 10 moves along a horizontal path defined by longitudinally extending structural members 11 and 12. A plurality of specially designed pallets 15 are positioned on the upper surface of the conveyor chain 10. Vehicles or portions of vehicles, such as automobiles and trucks are carried by the pallets 15. A lower return chain path is indicated by the reference number 13. The improved conveyor chain 10 can be used for purposes other than the FIG. 1 embodiment, showing a use in vehicle manufacturing.

Figure 2:
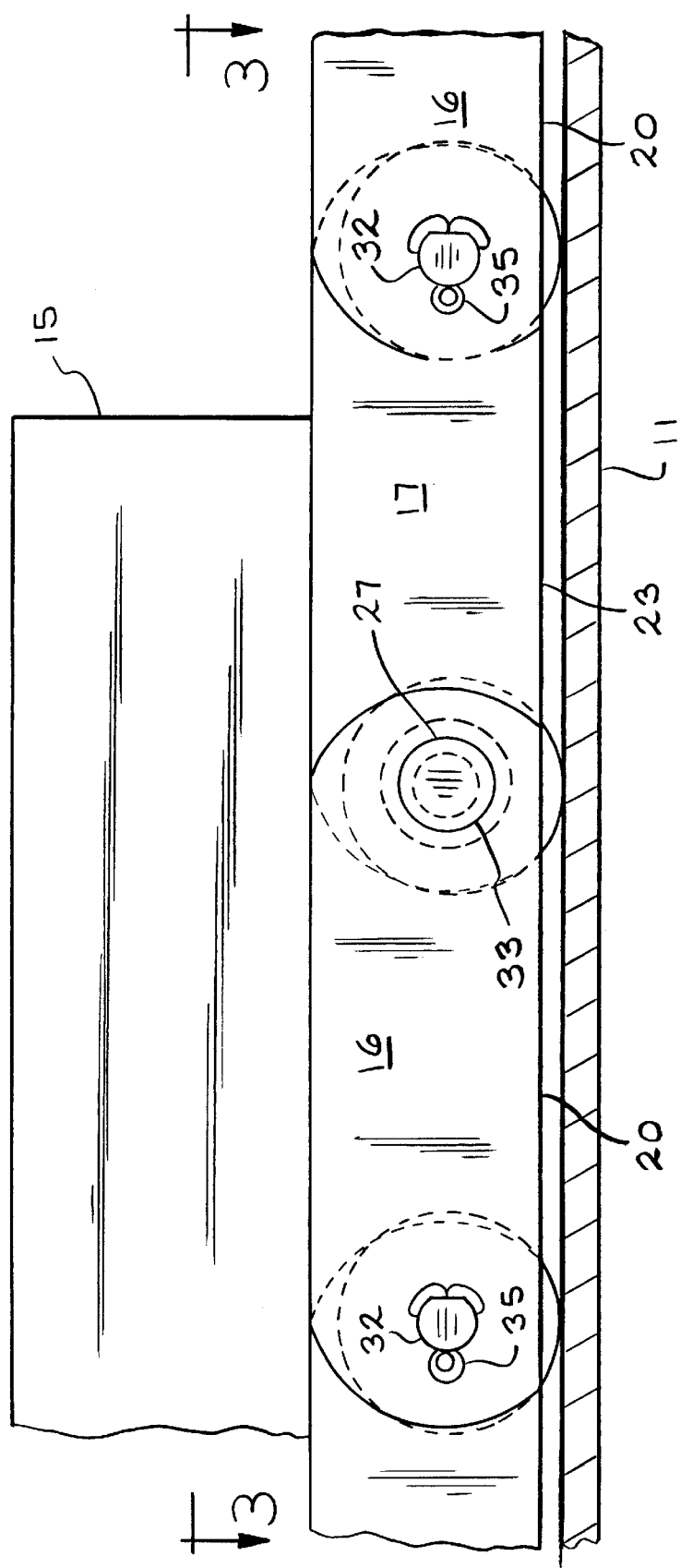
FIG. 2 is an enlarged side view, partially in cross-section of the manufacturing line, shown in FIG. 1 and showing the side elevation of the improved conveyor chain, according to the present invention.
Figure 3:
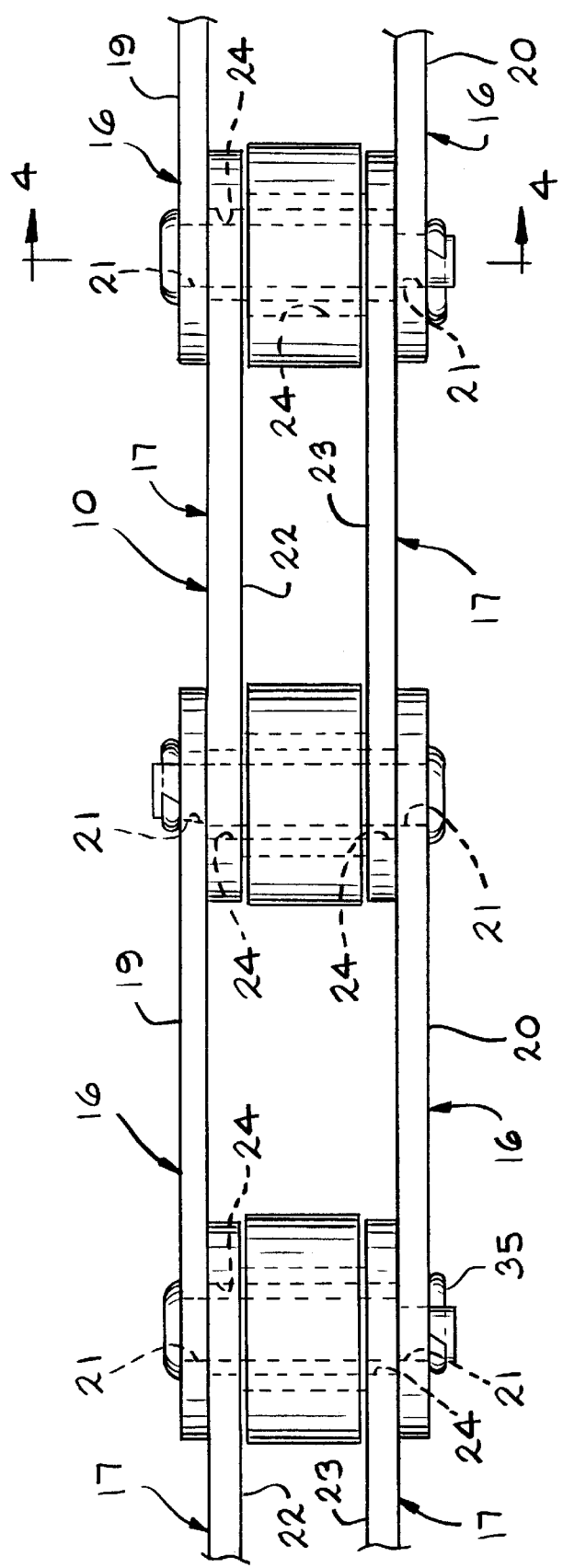
FIG. 3 is a top view of the conveyor chain, as shown in FIG. 2, taken along the line 3—3 of FIG. 2.

Referring to FIGS. 2 and 3, the conveyor chain 10 includes a plurality of link assemblies. In the present embodiment, these include pin link assemblies 16 and bushing link assemblies 17. The pin link assemblies 16 include metal side bars 19 and 20 having openings 21 at their opposed ends.

Each of the bushing link assemblies 17 includes a pair of spaced parallel metal side bars 22 and 23 having openings 24 at their opposite ends.

Figure 4:
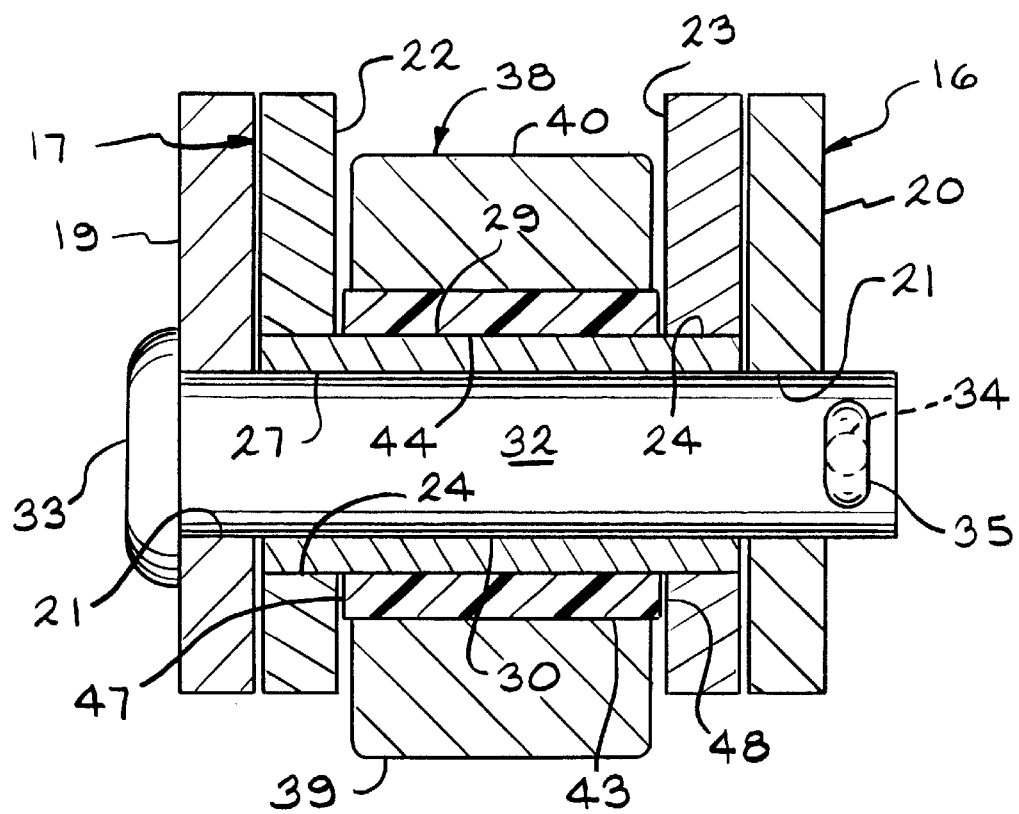
FIG. 4 is an enlarged cross-sectional view taken along the line 4—4 of FIG. 3.
Figure 5:
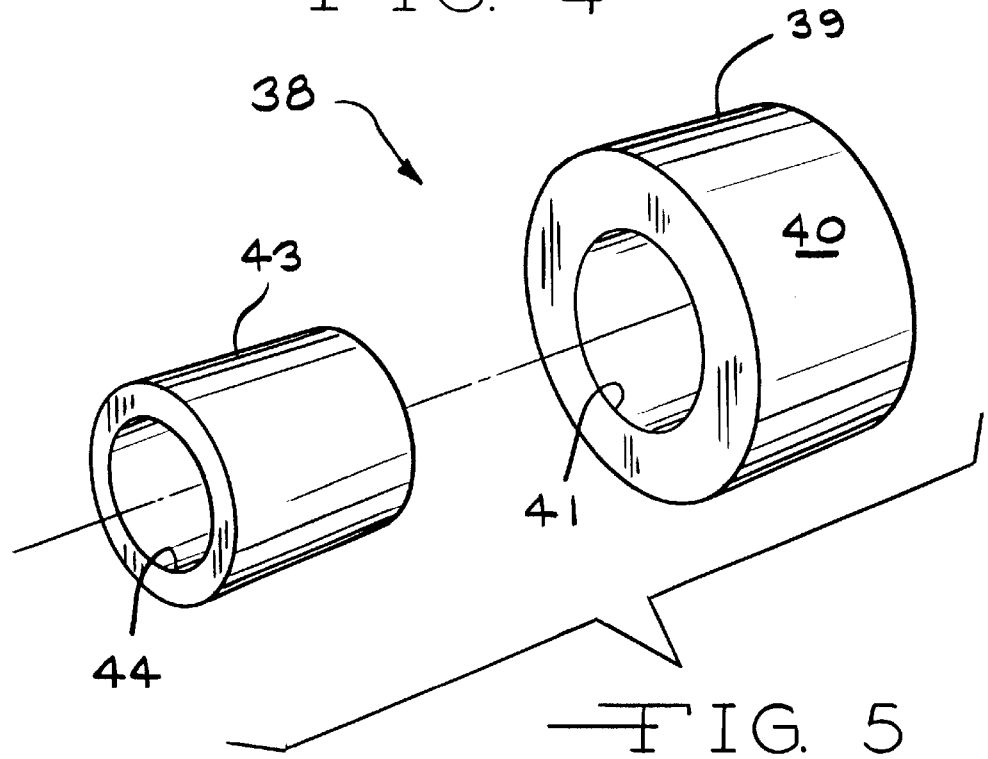
FIG. 5 is an exploded view, showing the components of the roller assembly.

As best shown in FIG. 4, a pair of spaced metal pin bushings 27 are received in the openings 24 of the spaced metal side bars 22 and 23. The metal pin bushings 27 are connected to the spaced metal side bars 22 and 23. Each of the metal pin bushings 27 includes an outer cylindrical surface 29 and an inner pin opening 30, extending therethrough. A metal pin 32 having a head 33 at one end and a cotter opening 34 at the other end extends between the aligned openings 21 of the side bars 19 and 20 and through the inner pin opening 30 defined by the metal pin bushing 27. After assembly, a cotter 35 is positioned in the cotter opening 34 to restrict longitudinal movement of the metal pin 32.

A roller assembly 38 includes an outer metal roller 39 defining an outer support surface 40 and an inner opening 41. A cylindrical plastic bushing 43 is mounted within the inner opening 41 of the roller 39. Preferably, the plastic bushing 43 is press fit within the inner opening 41 of the metal roller 39. The cylindrical plastic bushing 43 has an opening 44 which receives the metal pin bushing 27 and is rotatable on the metal pin bushing 27. The plastic bushing defines a lubricous surface 45 adjacent the outer cylindrical surface 29 of the metal pin bushing 27.

The plastic bushing 43 has a compressive strength between 20,000 psi and 25,000 psi, whereby the conveyor chain 10 is capable of supporting downward loads on its upper surface as the conveyor chain moves along the horizontal path, as shown in FIG. 1. Preferably the plastic bushing 43 has a compressive strength of at least 20,000 psi. The outer metal roller 39 of the roller assembly 38 has a predetermined width. The plastic bushing 43 has opposed ends 47 and 48 and a width greater than the predetermined width of the outer metal roller 39. Each of the ends 47 and 48 of the plastic bushing 43 extend outwardly from the outer metal roller 39 a predetermined distance. The upsets at the ends 47 and 48 serve as bumper protuberances to restrict the outer metal rollers 39 from engaging the side bars 22 and 23. Preferably, the predetermined distance forming the upset or bumper protuberance is approximately 0.0313 inch (0.008 cm.).

Preferably the plastic bushing 43 is constructed of a glass reinforced nylon which includes 2 to 3% of a solid silicon together with a Teflon® material (polytetraflorualethylene). It has been found that this material provides the required low coefficient of friction together with the required compressive strength whereby the engineering steel chain 10 carries a downward load as the chain 10 moves along its horizontal path.

The side bars 19 and 20, 22 and 23 are preferably constructed of steel. The metal pin bushings 27 are constructed of steel and preferably have a 32 micro-inch finish and carbonized to 55 to 60 Rockwell C (HRC) on the outer cylindrical surface 29 for contact with the plastic bushing 43 of the roller assembly 38. The outer metal rollers 39 are preferably metal being constructed of cold finish bar and carburized to 55/60 HRC at the outer support surface 40.

It has been found that the conveyor chain 10, according to the present invention, eliminates or greatly reduces the need for lubrication. The plastic bushing 43 is essentially impervious to solvents and unlike prior art plastic bushed chain utilized, for example in roller chains, it does not lower weight of the working load or the average ultimate strength of the chain.

Many revisions may be made to the conveyor chain described above, without departing from the scope of the present invention or from the following claims.

We claim:

1. A conveyor chain for carrying a load while moving along a horizontal path, said conveyor chain comprising a plurality of interconnected pin link and bushing link assemblies, each of said bushing link assemblies including a pair of spaced parallel metal side bars and a pair of spaced metal pin bushings extending between said side bars, each of said metal pin bushings defining a pin opening therethrough, said metal pin bushings defining an outer cylindrical surface, a roller assembly mounted for rotation on each of said metal pin bushings, each of said roller assemblies including an outer metal roller defining an outer support surface and an inner opening, a cylindrical plastic bushing mounted within said roller inner opening, said plastic bushing having an opening for receiving a metal pin bushing, said cylindrical plastic bushing defining a lubricous surface adjacent said outer surface of said metal pin bushing, said plastic bushing having a compression strength of between 20,000 and 25,000 psi whereby said conveyor chain is capable of supporting downward loads on its upper surface, as said conveyor chain moves along said horizontal path.

2. A conveyor chain, according to claim 1, wherein said plastic bushing has a compressive strength of at least 20,000 psi.

3. A conveyor chain, according to claim 1, wherein said outer metal roller of said roller assembly has a predetermined width, said plastic bushing being press fit within said inner opening of said outer metal roller, said plastic bushing having opposed ends and a width greater than said predetermined width of said outer metal roller, each of said ends extending from said outer metal roll a predetermined distance, whereby said ends of said plastic bushing serve as bumper protuberances to restrict said outer metal rollers from engaging said metal side bars.

4. A conveyor chain, according to claim 3, wherein said predetermined distance is approximately 0.0313 inch (0.008 cm).

5. A conveyor chain, according to claim 1, wherein said plastic bushing is constructed of a glass reinforced nylon and polytetrafluoroethylene.

6. A conveyor chain according to claim 5 wherein said plastic bushing includes silicon.

7. A conveyor chain for carrying a load while moving along a horizontal path, said conveyor chain comprising a plurality of interconnected link assemblies, said link assemblies include spaced parallel metal side bars and a plurality of roller assemblies mounted for rotation between said metal side bars, each of said roller assemblies including an outer metal roller defining an outer support surface and an inner opening, a cylindrical plastic bushing press fit within said inner opening of said outer metal roller, said plastic bushing having a compressive strength between 20,000 and 25,000 psi, said plastic bushing defining a central opening having a self lubricating lubricous surface.

8. A conveyor chain, according to claim 7, wherein said plastic bushing has a compressive strength of at least 20,000 psi.

9. A conveyor chain, according to claim 7, wherein said outer metal roller has opposed ends and a predetermined width, said plastic busing having a width greater than the predetermined width of said outer metal roller, said plastic bushing defining an upset at each end, whereby said upset restricts movement of said outer metal roller against said metal side bars.

* * * * *